United States Patent
Manning et al.

(10) Patent No.: US 9,818,998 B2
(45) Date of Patent: Nov. 14, 2017

(54) SEPARATOR FOR ELECTROCHEMICAL CELL WITH OVERCHARGE PROTECTION AND METHOD OF MAKING SAME

(71) Applicant: Freya Energy, Inc., Melbourne, FL (US)

(72) Inventors: Andrew James Manning, Randolph, NJ (US); Ethirajulu Dayalan, Tampa, FL (US)

(73) Assignee: Freya Energy, Inc., Melbourne, FL (US)

( * ) Notice: Subject to any disclaimer, the term of this patent is extended or adjusted under 35 U.S.C. 154(b) by 383 days.

(21) Appl. No.: 14/207,984

(22) Filed: Mar. 13, 2014

(65) Prior Publication Data
US 2014/0272530 A1    Sep. 18, 2014

Related U.S. Application Data

(60) Provisional application No. 61/780,886, filed on Mar. 13, 2013.

(51) Int. Cl.
*H01M 2/16* (2006.01)
*H01M 2/14* (2006.01)
*H01M 10/42* (2006.01)

(52) U.S. Cl.
CPC ......... *H01M 2/1686* (2013.01); *H01M 2/145* (2013.01); *H01M 2/162* (2013.01); *H01M 2/1653* (2013.01); *H01M 2/1666* (2013.01); *H01M 10/4235* (2013.01)

(58) Field of Classification Search
CPC .. H01M 2/1686; H01M 2/162; H01M 2/1653; H01M 2/1666; H01M 10/4235
See application file for complete search history.

(56) References Cited

U.S. PATENT DOCUMENTS

| | | | |
|---|---|---|---|
| 6,465,125 B1* | 10/2002 | Takami | H01M 2/1673 429/127 |
| 2007/0018141 A1* | 1/2007 | Kepler | H01B 1/06 252/500 |
| 2009/0029261 A1* | 1/2009 | Thomas-Alyea | H01M 2/166 429/248 |
| 2009/0176160 A1* | 7/2009 | Newman | H01M 2/1653 429/248 |
| 2012/0208082 A1* | 8/2012 | Honda | H01M 4/60 429/210 |

(Continued)

OTHER PUBLICATIONS

L.F. Xiao, X.P. Ai, Y.L. Cao, Y.D. Wang, and H.X. Yang, "A composite polymer membrane with reversible overcharge protection mechanism for lithium ion batteries", May 24, 2005, Electrochemistry Communications 7 (2005) pp. 589-592.*

(Continued)

*Primary Examiner* — Jonathan Jelsma
(74) *Attorney, Agent, or Firm* — Michael L. Leetzow, P.A.

(57) ABSTRACT

A separator for a rechargeable electrochemical cell that has a conductive first layer and a non-conductive second layer. The non-conductive second layer and the conductive first layer are adhered to one another, wherein the separator has a higher threshold voltage than a threshold voltage of the conductive first layer alone. At a predetermined voltage, the separator becomes conductive and stops further ionic transfers.

12 Claims, 5 Drawing Sheets

(56) References Cited

U.S. PATENT DOCUMENTS

2012/0312696 A1* 12/2012 Peled .................. H01M 4/9083
 205/334
2013/0244119 A1* 9/2013 Schaefer ............... H01M 2/162
 429/249

OTHER PUBLICATIONS

Guoying Chen and Thomas Richardson, "Overcharge Protection for High Voltage Lithium Cells Using Two Electroactive Polymers", Electrochemical and Solid State Letters, 9 (1) A24-A26 (2006).*

* cited by examiner

SEPARATOR FOR ELECTROCHEMICAL CELL WITH OVERCHARGE PROTECTION AND METHOD OF MAKING SAME

REFERENCE TO RELATED CASE

This application claims priority under 35 U.S.C. §119 (e) to provisional application No. 61/780,886, filed on Mar. 13, 2013, which is hereby incorporated by reference in its entirety.

BACKGROUND OF THE INVENTION

Field of the Invention

The present invention relates to a separator for an electrochemical cell and, in particular to a separator that prevents an electrochemical cell from overcharging and having an uncontrolled reaction. The separator provides cell-level protection intrinsic in its construction. The composition and construction of the separator protects the cell against overcharge with a mechanism that is reversible, and does not damage the electrochemical cell. It achieves this goal by becoming electronically/electrically conductive at a proscribed voltage (normally between 4.3 and 4.5v) and stopping further ionic transfer, thus protecting the cathode against over-delithiation and protecting the anode against excess lithiation and plating.

Advanced batteries, especially high-energy lithium ion batteries, offer the highest specific energy and highest energy density of all commercial batteries today. Lithium ion batteries simply by their nature of storing large amounts energy have the risk of significant incidents including explosions and fire.

The safety of higher energy lithium ion systems is very dependent on very careful electronic monitoring and control. If they are allowed to transfer too much lithium, or they are allowed to reach certain temperatures due to any one of many causes, or if the internal components of the cell are exposed to the atmosphere, the cells have a great tendency to initiate run-away exothermic reactions that lead to combustable gas generation, venting, fire and possible explosion.

In order to prevent these occurrences the charging and discharging of lithium ion cells must be controlled by an electronic circuit known as a battery management system (BMS).

While safe under controlled conditions, there are numerous incidents of battery failures catching fire, ranging from small cell phones, to laptop, e-bikes and even large aircraft batteries. As a result there are very strict regulations on the transport of lithium ion batteries.

Overcharging of the cell is one of several undesirable fundamental conditions, which can result in a violent cell/battery failure. Several things happen when a cell is overcharged. The first is that the voltage applied to the cell continues to rise in order to transfer more lithium ions. At higher voltages—typically around 5V, the electrolyte will react with the cathode and initiate an exothermic (runaway) reaction. Secondly, the removal of more than 50% of the lithium contained in most high-energy oxide type cathodes reduces the stability of the cathode material increasing the reactivity with the electrolyte. Further, overcharging results in excess lithium being forced into the anode even to the point of plating lithium on the surface of the carbon, which can lead to dendrite formation, and subsequent shorting, and can also react with the solvents in the electrolyte. An over-lithiated or even just fully-lithiated carbon anode is highly reactive, and will burst into flame when exposed to moist air. And, charging a cell generally causes an increase in temperature, simply due to resistive heating. Cells that suffer an overcharge-induced runaway exhibit very violent and energetic reactions, consuming all combustible material in the cell including the organic electrolyte, the separator, the carbon anode material and even the aluminum foil substrate of the cathode.

In prior art, Skylab fabricated polyimide (PI) into a micro porous battery separator. Solicore acquired the technology and attempted to apply it in rechargeable lithium ion cells. However, it was found that the separator became conducting at about 3.5 to 3.8V, which is too low to be useful for rechargeable lithium ions cells. (The material is still being used as a separator for lithium primary cells because of its strength.)

Conductive polymers have been known for a long time, and some behave like Zener diodes—they do not conduct until they reach a designed voltage. Other researchers such as those at Lawrence Livermore have worked on developing new conductive polymers with threshold voltages above 4V, but the problem has always been that the threshold voltage is normally in the range of 3.7 to 3.8V, which is not useful in high-energy oxide-based lithium ion batteries.

Policell explored the use of engineering polymers combined with lower melting point adhesive polymers to make a micro-porous separator for lithium ion cells. The engineering polymer provided strength and high temperature stability, and the lower melting point polymer was used to shut down the cell by blocking the separator pores when the cell reached a threshold temperature. The resulting material was brittle and not well suited for commercial products.

The present invention prevents an electrochemical cell from being overcharged, which may lead to a dangerous condition within the electrochemical cell and an uncontrolled reaction. The invention provides a robust, easily manufacturable separator.

SUMMARY OF THE INVENTION

The present invention is directed to a separator for use in a rechargeable electrochemical cell that includes a conductive first layer, a non-conductive second layer, the non-conductive second layer and the conductive first layer are adhered to one another, wherein the separator has a higher threshold voltage than a threshold voltage of the conductive first layer alone.

In some embodiments, the separator includes an adhesive, wherein the adhesive has an adhesion temperature below a first temperature and the second layer includes a resin having a melting temperature, and the first temperature being lower than the melting temperature of the resin.

In some embodiments, the separator is laminated to an anode of the rechargeable electrochemical cell.

In some embodiments, the non-conductive second layer includes polymers selected from the group consisting of chlorinated polypropylene, polypropylene-maleic anhydride copolymer, polyvinylideneflouride, and polyvinylideneflouride copolymers.

In another aspect, the present invention is directed to a separator for use in a rechargeable electrochemical cell that includes a conductive first layer made of polymeric material, and a non-conductive second layer, the non-conductive second layer made of a polymeric material in a polyolefin resin, the first layer and the second layer adhered.

In yet another aspect, the invention is directed to a method of making a separator for use in an electrochemical cell that includes the steps of making a first solution for a non-conductive first layer of the separator, the solution containing at least a polyolefin resin, drawing out the first layer, drying the first layer, making a second solution for a conductive second layer of the separator, the solution containing at least one conductive polymeric material and at least one polyolefin resin, drawing out the second layer on top of the first layer, and drying the second layer on top of the first layer.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description of the present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and, together with the description, serve to explain the principles and operations of the invention.

DETAILED DESCRIPTION OF THE PREFERRED EMBODIMENTS

Figure 1:
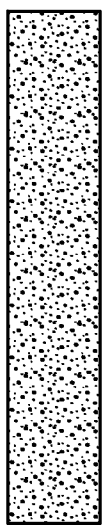
FIG. 1 is a schematic view of a prior art separator.

Reference will now be made in detail to the present preferred embodiment(s) of the invention, examples of which are illustrated in the accompanying drawings. Whenever possible, the same reference numerals will be used throughout the drawings to refer to the same or like parts.

A prior art separator is illustrated in FIG. 1. The most common prior art separator is comprised of a microporous non-conductive polymer, which being non-conducting allows the potential between the anode and the cathode reach tens or even hundreds of volts, resulting in a runaway exothermic reaction. In other prior art, as alluded to above, the separator is comprised of a micro porous conductive polymer such as PI, which becomes conducting at 3.5 to 3.8 volt potential across the film. However, this voltage makes the separator unsuitable for use in a typical high-energy rechargeable lithium ion cell, as it prevents the cell from being fully charged to 4.1 to 4.2 volts. Therefore, it is necessary to have a separator that supports the necessary voltage so as not to shut the electrochemical cell down prematurely.

Figure 2:
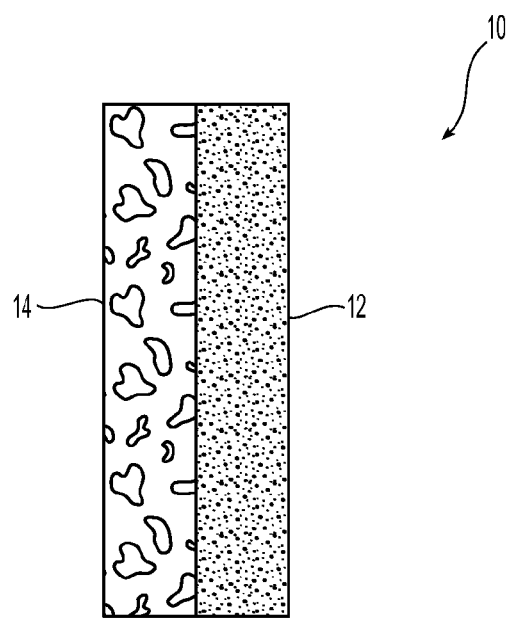
FIG. 2 is a schematic view of one embodiment of a two-layer separator according to the present invention.

As schematically illustrated in FIG. 2, a separator 10 has a first layer of a micro-porous conductive polymer 12. The separator 10 also has a second layer 14 of one or more essentially non-conductive polymers. The selection of the polymers that may be used in the second layer 14 includes polymers such as polyvinylidene fluoride (PVDF), Torlon® polyamide-imide (PAI), and polyolfinic derivatives. For reasons that will become evident later, one of the preferred materials is either a chlorinated polypropylene or polypropylene-maleic anhydride copolymer. The key properties of the second layer 14 are that the material be non-conductive, have sufficient adhesion to the first layer and be able to be made micro porous. Either layer or the composite may also optionally contain a non-woven scrim or web to provide added strength or puncture resistance to the separator 10.

Figure 3:
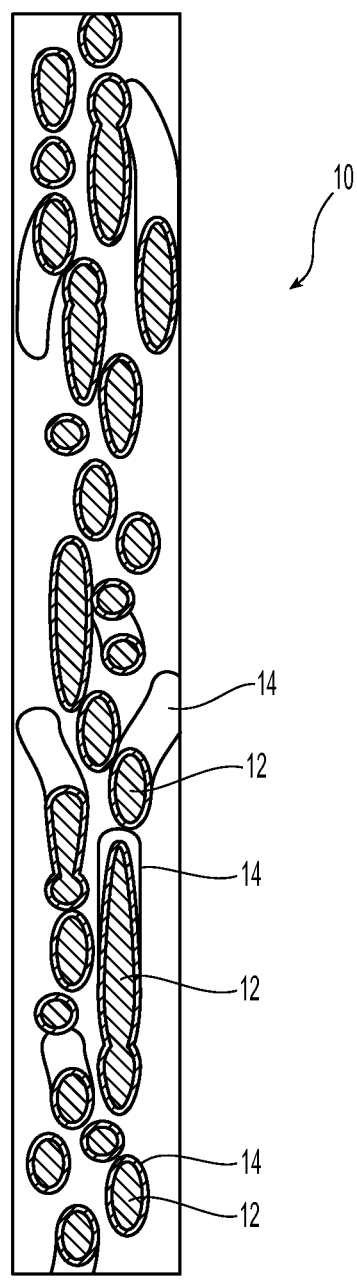
FIG. 3 is cross sectional view of a representation of a two-layer separator according to the present invention.

While FIG. 2 illustrates two layers in a schematic way, the first layer 12 may be a fibrous web of a micro-porous conductive polymer(s) that is then coated in the second layer 14 of one or more essentially non-conductive polymers. See, e.g., FIG. 3.

It is essential to the invention that the separator 10 be microporous. There are several ways to ensure that. The layers 12,14 of the separator 10 can be made micro porous by the addition of a pore former (such as tetrabutylammoniumbromide (TBAB), soluble waxes, dibutylphthlate (DBP) or other known pore formers, which are extracted after the formation of the layers 12,14 or the separator 10. Most pore formers have to be removed by washing with water or extracting with solvent followed by drying. Further, most pore formers have an adverse effect on the performance of a lithium/lithium ion cell if they are not completely removed. The use of ethylene carbonate (EC) as a pore former is unique and offers substantial benefits. First, it is a solid at room temperature (MP is about 40° C.) so it precipitates insitu as the layers 12,14 of the separator 10 cools to form a dispersed solid, rather than evaporating with the solvent. The dispersed solids sublime (evaporate) and the sequential nature of the process creates the micro-porosity without the need of washing or extracting. Secondly, EC is an electrolyte solvent and residual EC has no detrimental effects on the cell.

Another way the layers 12,14 or the separator 10 may be made porous, without using a pore former, is to incorporate a second polymer, which is incompatible with the conductive polymers in the layers 12,14. As described in more detail below, a coating is made by using a solvent system, which will dissolve two polymers, especially at elevated temperatures. This coating can be processed two different ways. It can form an interpenetrating polymer network, or one resin can be preferentially phased out first during drying by controlling the solvency of the solvent system.

A third method of creating micro pores is to create the conductive polymer as a web or non-woven scrim for the first layer 12 and then the second layer 14 can be applied directly.

In assembling the separator 10, the two layers 12,14 need to be adhered to one another. While they may be placed adjacent to one another if they are two separate layers, they must adhere to one another if one layer is applied to the second layer. Otherwise, there may be a breakdown in the function of the separator 10. However, when adhering one layer to the other, care must be taken not to blind the micropores that have been created. This is relatively simple if a pore former, as discussed above, is used. Care must be taken to ensure that the pore former is not extracted until both layers 12,14 are constructed to form the separator 10. In this way, the pore former acts as a place-holder for the micro-pores and the micro-pores are present after the pore former is removed (e.g., sublimation, washing, etc.)

Another way to ensure the micro-porosity of the separator 10 is to use resins and solvents (discussed in more detail below) such that the polymers in the layer have a poor cohesive strength, thereby forming micropores in the layer.

Figure 4:
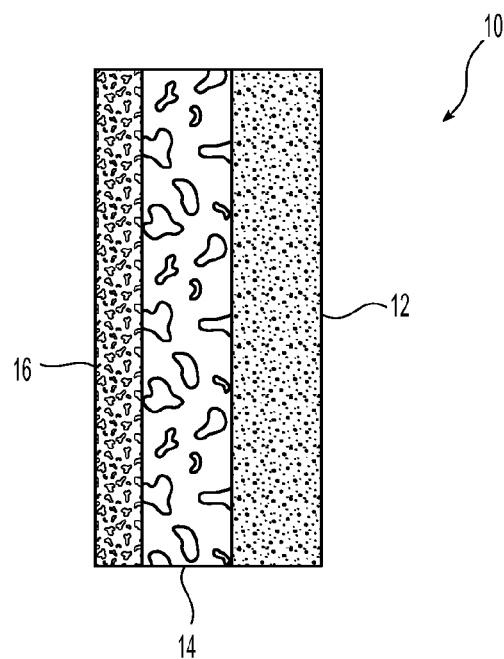
FIG. 4 is a schematic view of a two-layer separator with an adhesive layer.

As noted above, if the separator 10 is made of two separate layers, then the two layers could be placed adjacent to one another. Additionally, they could be adhered to one another using an adhesive 16. A schematic of this configuration is illustrated in FIG. 4. However, in one embodiment of the present invention, the adhesive 16 is incorporated into the second layer 14. The adhesive 16 is a resin that can be dispersed with the layer 14 in one of two ways. First, there are two resins in solution and they can be made to sequentially precipitate out upon drying under known conditions to form an interpenetrating network or second, where one of the resins is dispersed within the other. The microporosity is caused by choosing resins for the solution for layer 14 that are not totally compatible in solution, so that when the first resin precipitates out, the second resin forms around the first resin and the interfacial boundary creates the voids which are the path for the electrolyte in the electrochemical cell.

The adhesive 16 is comprised of micro-particles distributed throughout the non-conductive second layer, preventing the adhesive from blinding the micro pores in the second layer 14 (and the first layer 12 as well) as would occur with an adhesive film.

Figure 5:
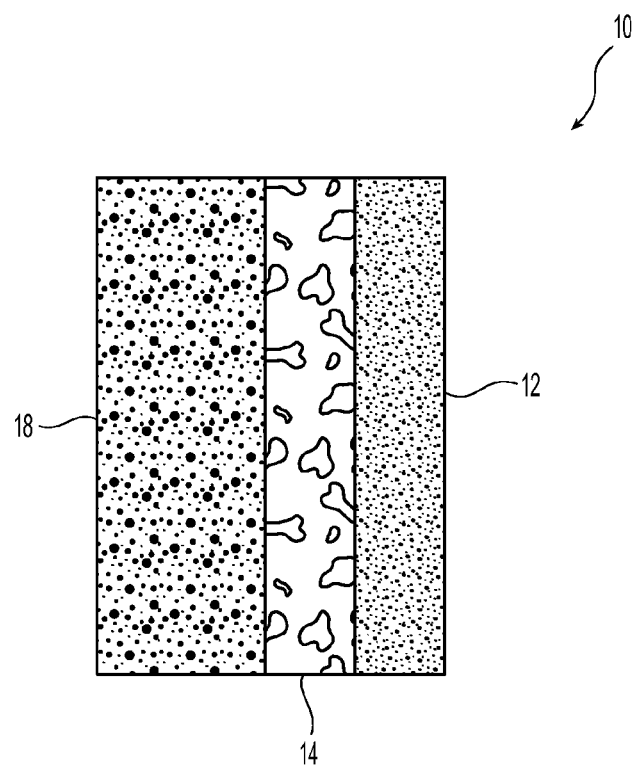
FIG. 5 is a schematic view of one embodiment of a two-layer separator laminated to an anode according to the present invention.

The separator 10 can then be laminated to an anode 18 of the electrochemical cell as illustrated in FIG. 5 using the adhesive 16 in layer 14. In fully lithiated or over-lithiated electrochemical cells, the amount of lithium contained within the anode is sufficient to make it potentially dangerous. Fully lithiated anodes will burst into flame if exposed to moist air. Over-lithiated anodes are even more dangerous, as they may have lithium dendrites (comprised of high surface area lithium metal). Laminating the separator 10 to the anode 18 provides a migration barrier for the moisture in the air, thus slowing down the reaction and preventing a runaway exothermic reaction that results in fire.

Alternatively, as explained in more detail below in the examples, rather than preparing the layers 12,14 on a glass plate or other substrate, the layers 12,14 could be prepared on an anode, which will adhere the layers 12,14 to the anode 18. As will be recognized by one skilled in the art, multiple anodes could be made in this way at one time.

Figure 6:
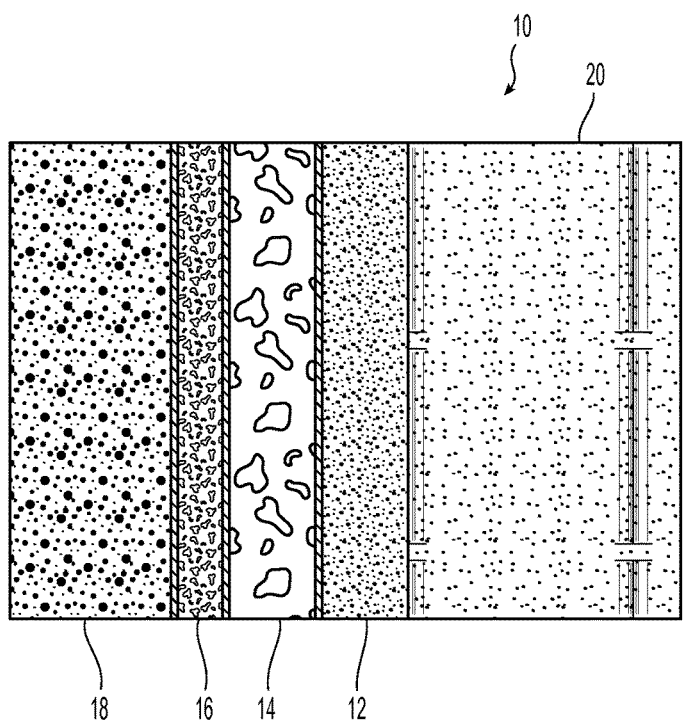
FIG. 6 is a schematic view of one embodiment of a two-layer separator in an electrochemical cell according to the present invention.

Once the separator 10 is adhered to the anode 18, a cathode 20 is added to the structure as illustrated in FIG. 6. The cathode 20 can be physically held against the separator 10 as is done in conventional lithium ion cells, or a second adhesive layer can be applied on the cathode side of the separator 10 or a bonding resin can be added to the first layer 12 as was done in the second layer 14 and laminated to the cathode 20.

Turning now to specific examples of the separator 10 described above, a first example is provided. In this example, the second layer 14 is made before the first layer 12.

EXAMPLE 1

A Coating Solution is Made of the Following Formulation

| Non conductive layer Formulation | Percentages (from about to about) |
|---|---|
| Higher Melting (>100° C.) Chlorinated polypropylene 15% Cl | 2.0-3.5 |
| Lower melting (~85° C.) Chorinated polypropylene or polypropylene maleic anhydride co-polymer | 0.5-2.0 |
| fumed silica or other ceramic filler | 2.0-4.0 |
| pore former - EC or other | 0-9 |
| Solvent 1 - tetrachloroethylene or other | 55-65 |
| Solvent 2 - cyclohexanone or other | 20-35 |
| Total | 100 |

The molecular weight of the chlorinated polypropylene is chosen to give a melt or softening temperature of greater than 100° C. The second resin can be chlorinated polypropylene or polypropylene-maleic anhydride co-polymer with a melting point of 85° C. The coating solution is maintained at about 80° C., and cast on a glass plate (at room temperature) using a 6 mil drawdown bar. A piece of Porous Power's PVDF coated non-woven is laid into the wet coating on the glass plate and rolled in to completely saturate and embed it in the first solution. The material is allowed to flash-dry to the point where the surface is no longer glossy and can be touched.

At this point a second coating (the first layer 12) of the following formulation is applied:

| Conductive layer Formulation | Percentages (from about to about) |
|---|---|
| High Temperature Chlorinated Polypropylene 26% Cl | 0-5 |
| Polyetherimide or other conductive polymer | 5-15 |
| Fumed silica or other ceramic filler | 0-3 |
| Solvent 1 - tetrachloroethylene or other | 20-50 |
| Solvent 2 - n-methyl-pyrrolidone or other | 30-85 |
| Pore former - EC or other | 0-10 |
| Total | 100 |

The coating is maintained at about 90° C. and is drawn down over the first coating using a six mil draw down bar. The separator 10 is allowed to air dry for 4 hours and then soaked in distilled water until the film floats off the glass. The layers 12,14 are then dried at ambient temperature in a vacuum oven overnight. During the drying in the vacuum oven, the pore former (EC or equivalent sublimates leaving the micropores in the separator 10.

The separator 10 will be white when it dries—indicating the microporous nature. The separator 10 is then laminated to the anode 18 using a cold roll laminator with a preheat zone set at 85° C. It should be noted that the melting point of the chlorinated polypropylene or polypropylene-maleic anhydride co-polymer is at the temperature of the laminator, making the chlorinated polypropylene or polypropylene-maleic anhydride co-polymer the adhesive 16 in this example. Since the second layer 14 was made first, the side in contact with the glass must face the anode 18.

An electrochemical cell is then built using the anode 18 with laminated separator and a matched cathode 20.

EXAMPLE 2

A 16 micron non-woven web comprised of fibers of a conductive polymer, acting as the conductive first layer 12, is saturated and coated with the following formulation:

| Non conductive layer Formulation | Percentages (from about to about) |
|---|---|
| Higher Melting (>100° C.) Chlorinated polypropylene 15% Cl | 2.0-3.5 |
| Lower melting (~85° C.) Chorinated polypropylene or polypropylene maleic anhydride co-polymer | 0.5-2.0 |
| fumed silica or other ceramic filler | 2.0-4.0 |
| pore former - EC or other | 0-9 |
| Solvent 1 - tetrachloroethylene or other | 55-65 |
| Solvent 2 - cyclohexanone or other | 20-35 |
| Total | 100 |

The resultant re-enforced film is washed, if necessary, air dried and then dried at ambient temperature in a vacuum oven overnight. The washing may be necessary depending on the pore former. In this example EC is specifically illustrated and, as noted above, sublimates and therefor does not require washing. The separator 10 will be white when it dries—indicating the microporous nature. The separator 10 is then laminated to an anode 18 using a cold roll laminator with a preheat zone set at 85° C. for the reasons noted above.

EXAMPLE 3

The 16 micron non-woven web comprised of fibers of a conductive polymer from Example 2 is saturated and coated with the following formulation:

| Non conductive layer Formulation | Percentages (from about to about) |
|---|---|
| Higher Melting (>100° C.) Chlorinated polypropylene 15% Cl | 2.0-3.5 |
| Lower melting (~85° C.) Chorinated polypropylene or polypropylene maleic anhydride co-polymer | 0.5-2.0 |
| fumed silica or other ceramic filler | 2.0-4.0 |
| pore former - EC or other | 0-9 |
| Solvent 1 - tetrachloroethylene or other | 55-65 |
| Solvent 2 - cyclohexanone or other | 20-35 |
| Total | 100 |

The wet saturated separator 10 is then laid directly on an individual anode 18 or a length of anode material out of which are cut individual anodes, as noted above. In this example, it is particularly valuable to use EC or another pore former that does not require washing. The anode/separator 18,10 composite is then air dried and then vacuum dried at temperatures up to about 60° C. until the solvent and the pore former are removed.

Figure 7:
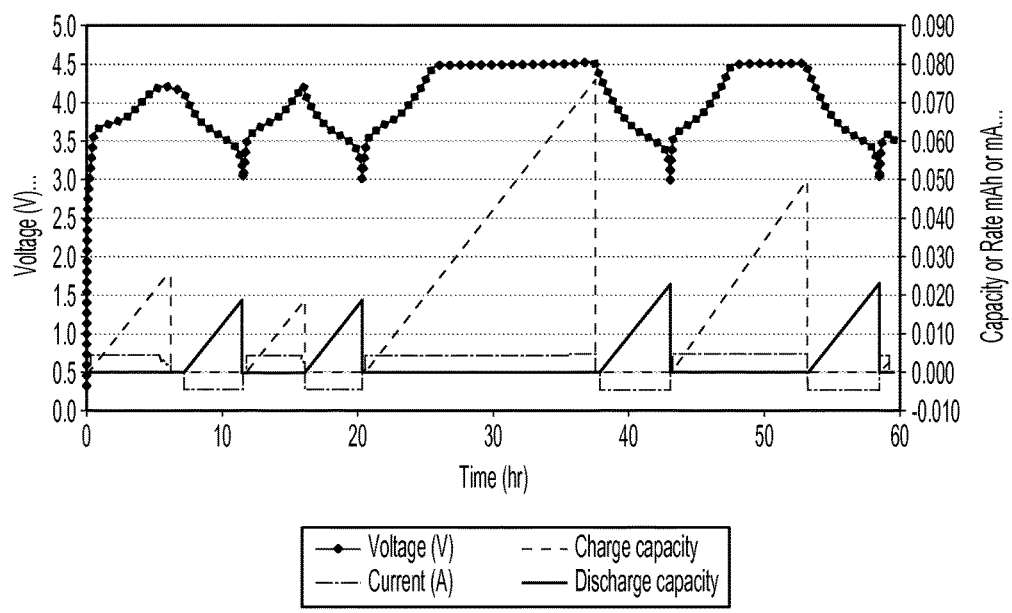
FIG. 7 is a graph showing the response of an electrochemical cell to overcharging that has a separator according to the present invention.

A separator 10 according to the present invention is demonstrated in FIG. 7 where the electrochemical cell is subjected to overcharging. The ionic transport within the electrochemical cell stops when the "threshold voltage" of the separator is reached. The separator becomes electrically conducting and transfers the applied current across the electrochemical cell without allowing any increase in voltage. The graph shows an electrochemical cell subjected to a formation cycle followed by a cycle at C/5, and then subjected to an overcharge totaling 3 times the nominal capacity of the cell.

The voltage line on this graph shows the voltage behavior of an electrochemical cell with separator 10. The first two cycles are perfectly normal. It is noted that the first cycle (between 0 and 10 hours) is the formation step and the charge capacity is greater than the discharge. On cycle 2 (between 10 and 20 hours), there is a very good correlation between the charge and discharge, showing typical columbic efficiency. Cycle 3 is a forced overcharge. On cycle 3 between 20 and 45 hours, the cell voltage continues to rise as the cell starts to be overcharged. However when the voltage reaches 4.5V, it plateaus (unlike a cell with a conventional separator that continues to rise—see FIG. 8). The current line shows that the current is still flowing through the cell and the charge capacity line continues to rise. At the end of the cycle, the cell is seen to discharge normally. The discharge capacity line shows that the full capacity is discharged. In fact, the discharge capacity is slightly higher, representing the difference between the programmed 4.2V limit and the 4.5V limit of the separator. Cycle 4 between 45 and 60 hours shows a second overcharge for twice the nominal capacity, which shows it can be done repeatedly. Again the voltage plateaus and the electrochemical cell discharges normally.

To continue to transportions (charge) in an electrochemical cell, the voltage has to continue to be increased. When overcharging a cell with a conventional separator, the voltage continues to rise to the limit of the charger or until a runaway reaction takes place.

Figure 8:
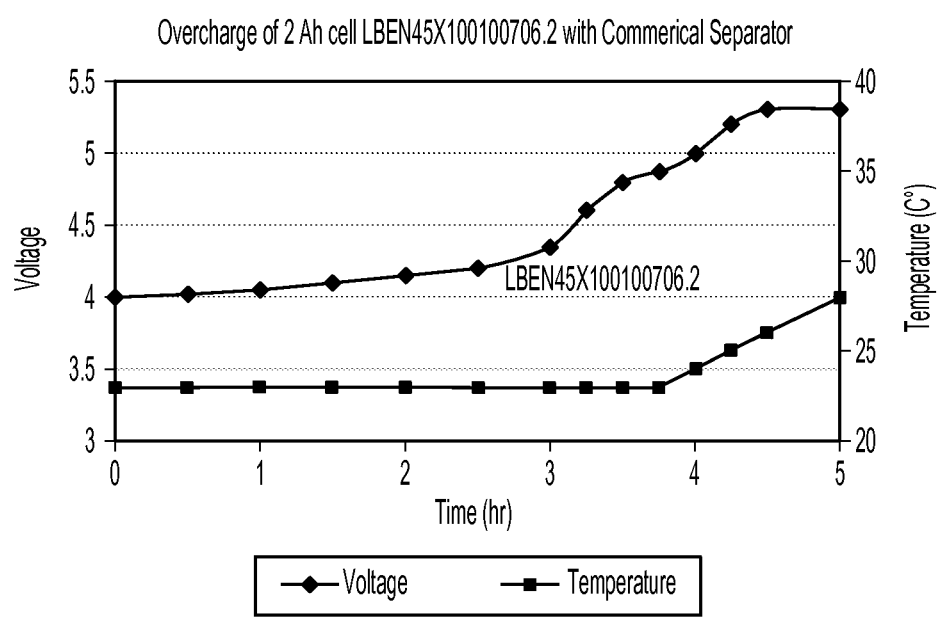
FIG. 8 is a graph showing the response of an electrochemical cell to overcharging that has a commercial separator.

As illustrated in FIG. 8, the voltage is seen to increase steadily to about 5.3V. At this point the electrochemical cell expanded like a balloon (as it was not restrained) and the electrochemical cell electrodes became loose and disconnected. If the electrochemical cell had been retained it would have burst, expelled flammable vapors and most likely caught fire.

By providing effectively an electrical switch making the composite electrically conductive at given voltage, it is possible to prevent further transport of ions in an electrochemical cell. Once the applied voltage is removed, the separator again becomes electrically non-conducting and the electrochemical cell is stable. It was determined that the threshold voltage could be varied from 3.8V to 4.8V by controlling the composition and thickness of the layer(s).

It will be apparent to those skilled in the art that various modifications and variations can be made to the present invention without departing from the spirit and scope of the invention. Thus it is intended that the present invention cover the modifications and variations of this invention if they are within the scope of the appended claims and their equivalents.

We claim:

1. A separator for use in a rechargeable electrochemical cell comprising:
    an electrically conductive first layer that includes a chlorinated polypropylene and has a first threshold voltage; and
    an electrically non-conductive second layer, the electrically non-conductive second layer and the electrically conductive first layer are adhered to one another and have a second threshold voltage, the second threshold voltage being greater than the first threshold voltage, and wherein the electrically non-conductive second layer includes polymers selected from the group consisting of chlorinated polypropylene, polypropylene—maleic anhydride copolymer, polyvinylideneflouride, and polyvinylideneflouride copolymers.

2. The separator according to claim 1, wherein the separator becomes conductive at between about 4 V and about 5 V.

3. The separator according to claim 1, wherein the electrically conductive first layer includes a fibrous polymer web.

4. The separator according to claim 1, further comprising an adhesive incorporated into the electrically non-conductive second layer.

5. The separator according to claim 4, wherein the adhesive comprises micro-particles distributed throughout the electrically non-conductive second layer.

6. The separator according to claim 1, further comprising an adhesive, wherein the adhesive has an adhesion temperature below a first temperature and the second layer includes a resin having a melting temperature, and the first temperature being lower than the melting temperature of the resin.

7. The separator according to claim 1, wherein the separator is laminated to an anode of the rechargeable electrochemical cell.

8. A rechargeable electrochemical cell containing the separator according to claim 1.

9. A method of making a separator for use in an electrochemical cell comprising the steps of:

making a first solution for an electrically non-conductive first layer of the separator, the solution containing polymers selected from the group consisting of chlorinated polypropylene, polypropylene—maleic anhydride copolymer, polyvinylideneflouride, and polyvinylideneflouride copolymers;

drawing out the electrically non-conductive first layer;

drying the electrically non-conductive first layer;

making a second solution for a conductive second layer of the separator, the solution containing a chlorinated polypropylene;

drawing out the second layer on top of the first layer; and drying the second layer on top of the first layer, the conductive second layer having a first threshold voltage alone and the combined first and second layers having a second threshold voltage being greater than the first threshold voltage.

10. The method of claim 9, further comprising the step of:

embedding a electrically non-conductive polymeric non-woven web into the drawn out first layer and before drawing the second layer on top thereof.

11. The method of claim 9, further comprising the step of providing a non-woven web of electrically conductive polymer fibers on to which the first solution is drawn.

12. The method of claim 9, wherein the steps are done on an anode for an electrochemical cell.

\* \* \* \* \*